June 23, 1964 J. J. SOKOL 3,137,969
AUTOMATIC WATER DISPENSER FOR TREE
Filed April 16, 1962
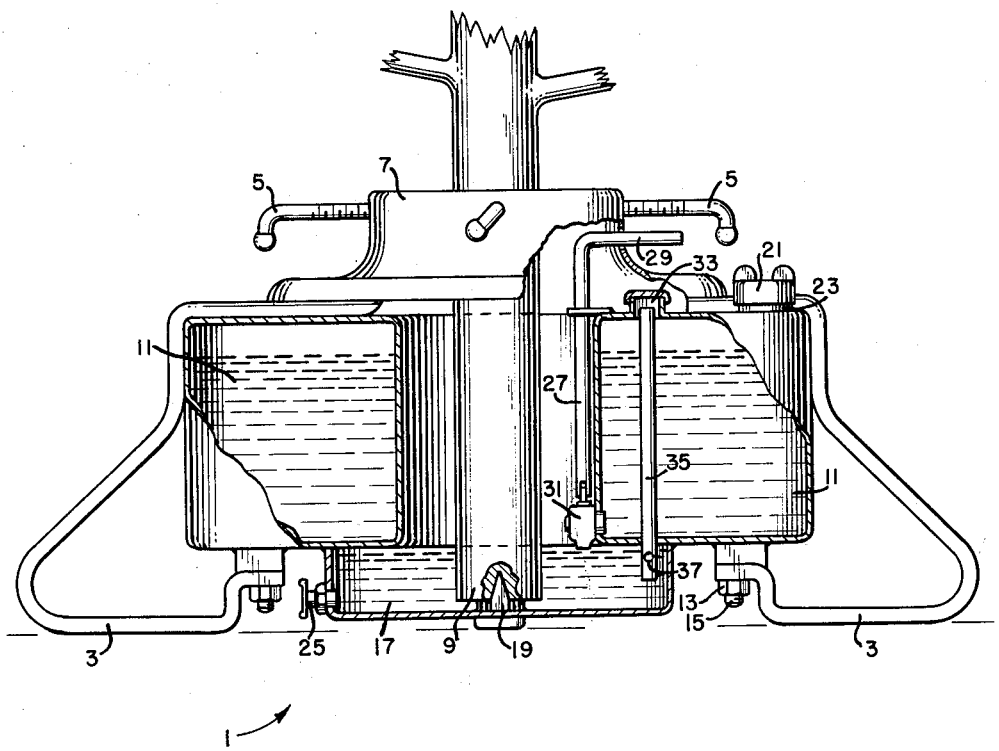
INVENTOR.
JOHN J. SOKOL
BY
Walter F. Wessendorf Jr
attorney

United States Patent Office

3,137,969
Patented June 23, 1964

3,137,969
AUTOMATIC WATER DISPENSER FOR TREE
John J. Sokol, 91 Lincoln Ave., Colonie, Albany, N.Y.
Filed Apr. 16, 1962, Ser. No. 187,558
2 Claims. (Cl. 47—57.5)

This invention relates to a dispenser for a Christmas tree and the like whereby not only water is automatically dispensed to the bark and cellular structure of the tree as the tree needs water, but also the tree is supported in an upright position in the stand portion of the dispenser.

Considering the fact that Christmas trees are cut in cold weather at the end of November or early part of December and thereafter marketed, the trees purchased by consumers are in relatively fresh condition. Without water being provided for the tree that is placed in a warm room, the tree will dry out and the needles fall off the tree in a relatively short period of time. With the quantity of Christmas tree lights that decorate the tree nowadays, the presence of the fire hazard created by a dried out tree should be obvious.

Moreover, the average householder is aware of the necessity of providing water for the tree to not only reduce the fire hazard, but also to keep the tree fresh. The quantity of electrical lights utilized in decorating the tree, and other decorations, however, renders the householder reluctant to be bothered with providing water for the tree in the old-fashioned approach of a water pail with the trunk of the tree placed therein filled with coal coupled with the inaccessibility occasioned by the lower drooping branches of the tree. Then too, watering the tree necessitates moving the presents placed under the tree and rearranging the presents after completion of the watering task. The task is coupled with the possibility of spilling the water in the attempt.

Therefore, it is an object of this invention to provide a water dispenser for a Christmas tree that upon being filled with water and the trunk of the tree being inserted therein will thereafter dispense water automatically dependent upon the water requirements of the tree.

Another object of the invention is to provide a reservoir of water that will hold a sufficient quantity of same for a two week period of time.

An additional object of the invention is to provide a dispenser having a reservoir that need be filled only once at the sink tap.

A still further object of the invention is to provide a valve for the dispenser reservoir to control the release of the water contained in the reservoir.

Another object of the invention is to provide a dispenser having a stand incorporated therewith to hold the tree in an upright position.

A further object of the invention is to provide a well into which the trunk of the tree is placed and which functions to provide water for the tree and to receive water from the reservoir.

These and other objects of the invention should be appreciated from the detailed specification taken in conjunction with the drawing showing a front view of the dispenser part of which is broken away and in section.

Reference numeral 1 generally refers to the dispenser having four legs 3 arranged equiangularly therearound. Four thumb screws 5 arranged and situated similar to legs 3 engage suitable screw holes in the top portion of circular flange 7 suitably secured and upstanding from the terminal portions of legs 3 for purposes of centering the trunk 9 of the tree within the interior of flange 7.

A donut shaped reservoir 11 is received within the framework of legs 3 and suitably secured therewith by nuts 13 engaged with studs 15 depending from the bottom portion of reservoir 11.

Further secured to and depending from the bottom portion of reservoir 11 is a cylindrically shaped open well 17. Upstanding from the internal bottom portion of well 17 is centering prong 19 which imbeds itself in the bottom of trunk 9 when the tree is uprightly disposed in the dispenser.

An airtight filler cap 21 lockingly engages filler opening 23 formed as an open upstanding cylindrical portion of reservoir 11. Drain plug 25 extends horizontally from the side wall portion of well 17.

Arranged and disposed within the donut hole of reservoir 11 is a valve stem 27 having at its upper terminal portion a handle 29 extending normal therefrom and reciprocable to on and off positions within a complementally configured cutout portion formed in flange 7.

At the other end of stem 27 is a one-quarter inch outside diameter pet cock valve 31, quick opening upon one-quarter turn of handle 29. Valve 31 is arranged and constructed such that upon opening of same communication is effected from reservoir 11 to well 17.

It should also be appreciated that valve 31 and stem 27 may be arranged and disposed internally of reservoir 11.

Upstanding from reservoir 11 is upper reservoir 33 extending into which is vent tube 35 the bottom portion of which extends substantially within well 17 as shown. A small suction hole 37 is formed through vent tube 35 one-quarter inch from the end thereof and located below the discharge opening of valve 31.

In using the dispenser the householder would first actuate valve 31 to its shut off position. Filler cap 21 is removed, the reservoir 11 is filled with water to its nine quart capacity and then filler cap 21 is replaced on filler opening 23. A quart of water is poured into well 17 and then the bottom portion of trunk 9 is emplaced in such a manner that prong 19 will be imbedded therein. The thumb screws 5 are manipulated to such a degree that the tree will be positioned uprightly.

Handle 29 is moved to its position where valve 31 is open. When the water level in well 17 goes below the bottom of vent tube 35, the partial vacuum in reservoir 11 will be relieved thereby allowing water to enter well 17 from reservoir 11 through open valve 31 filling up well 17 to the top of suction hole 37. The water level therefore will be maintained automatically between the level of the top of suction hole 37 and the bottom of vent tube 35.

It should further be appreciated that it is within the scope of this invention to utilize a one-half inch outside diameter pet cock valve, quick opening upon one-quarter turn of the handle, in place of the valve and vent tube heretofore described. In such case the water level in well 17 will be maintained at the level of the valve.

Inasmuch as the reservoir 11 holds nine quarts of water, this supply will be sufficient to satisfy the water requirements of the tree for a two week period of time. At the conclusion of the Yuletide Season and after householder has removed the tree, the drain plug may be opened to drain out any water remaining in well 17.

Having thusly described my invention, I claim:

1. A dispensing system comprising a reservoir holding a supply of liquid, a well containing liquid, a valve the opening of which allows communication to be effected between said reservoir and said well, a vent tube arranged within said reservoir and extending upwardly above said reservoir into an upper reservoir upstanding from said reservoir, the lower portion of said vent tube extending downwardly into said well, there being a suction hole formed through said vent tube and located below the bottom portion of the discharge portion of said valve.

2. A dispenser for automatically watering a Christmas tree, comprising in combination a stand for holding the tree in an upright position, reservoir means for holding a quantity of water, well means containing water for the tree, dispensing means for dispensing water automatically from said reservoir to said well means, all of said means being so cooperatively and correlatively associated, arranged and constructed such that said reservoir holds a quantity of water, said well means contains water for the tree and said dispensing means automatically dispenses water from said reservoir means to said well means, said dispensing means comprising a valve which upon being opened allows communication from said reservoir means to said well means, a vent tube arranged within said reservoir means and extending below said reservoir means into said well means and said vent tube being provided with a small suction hole formed through said vent tube in its location in said well means.

References Cited in the file of this patent

UNITED STATES PATENTS

| | | |
|---|---|---|
| 2,071,887 | Malin | Feb. 23, 1937 |
| 2,288,678 | Blumentritt | July 7, 1942 |
| 2,938,304 | Thomas | May 31, 1960 |
| 2,994,498 | Sager | Aug. 1, 1961 |
| 3,049,834 | Heath | Aug. 21, 1962 |
| 3,066,446 | Buttinger | Dec. 4, 1962 |

FOREIGN PATENTS

| | | |
|---|---|---|
| 1,237,621 | France | June 20, 1960 |
| 29,333 | Germany | Nov. 12, 1884 |
| 14,554 | Great Britain | of 1907 |
| 83,441 | Sweden | May 21, 1935 |

OTHER REFERENCES

German Application 1,052,652, printed Mar. 12, 1959.